US012337445B2

(12) United States Patent
Chen

(10) Patent No.: US 12,337,445 B2
(45) Date of Patent: Jun. 24, 2025

(54) TORQUE WRENCH

(71) Applicant: JU HE INDUSTRY CO., LTD., Taichung (TW)

(72) Inventor: Ting-Yuan Chen, Taichung (TW)

(73) Assignee: JU HE INDUSTRY CO., LTD., Taichung (TW)

( * ) Notice: Subject to any disclaimer, the term of this patent is extended or adjusted under 35 U.S.C. 154(b) by 412 days.

(21) Appl. No.: 18/146,266

(22) Filed: Dec. 23, 2022

(65) Prior Publication Data

US 2024/0208015 A1 Jun. 27, 2024

(51) Int. Cl.

*B25B 23/142* (2006.01)
*B25B 13/46* (2006.01)
*B25B 23/16* (2006.01)

(52) U.S. Cl.

CPC .......... *B25B 23/1427* (2013.01); *B25B 13/46* (2013.01); *B25B 23/16* (2013.01)

(58) Field of Classification Search

CPC . B25B 23/1427; B25B 23/16; B25B 23/1425; B25B 21/00; B25B 21/004; B25B 21/005; B25B 13/46; B25B 13/463; B25B 13/465

See application file for complete search history.

(56) References Cited

U.S. PATENT DOCUMENTS

| | | | | |
|---|---|---|---|---|
| 9,561,583 | B2 * | 2/2017 | Hsieh | B25B 23/1422 |
| 10,179,396 | B2 * | 1/2019 | Hsieh | G01L 25/003 |
| 10,814,461 | B2 * | 10/2020 | Doroslovac | B25F 5/02 |
| 11,338,417 | B2 * | 5/2022 | Hsieh | B25B 23/141 |
| 11,766,770 | B2 * | 9/2023 | Silha | B25B 13/10 81/52 |
| 2020/0215666 | A1 * | 7/2020 | Schultz | B25B 13/465 |
| 2023/0264328 | A1 * | 8/2023 | Anjanappa | B25B 23/1427 81/479 |
| 2023/0302612 | A1 * | 9/2023 | Hsieh | F16N 7/02 |
| 2023/0364755 | A1 * | 11/2023 | Anjanappa | G01L 5/24 |
| 2024/0131664 | A1 * | 4/2024 | Lai | B25B 13/463 |
| 2024/0131665 | A1 * | 4/2024 | Lin | B25B 23/1427 |

* cited by examiner

*Primary Examiner* — David B. Thomas

(74) *Attorney, Agent, or Firm* — Sinorica International Patent & Trademark

(57) ABSTRACT

A torque wrench has a force-applying rod. The force-applying rod is connected to a transmission rod. The transmission rod can swing relative to the force-applying rod. A transmission shaft is disposed in the transmission rod. Two ends of the transmission shaft are connected to a drive unit and a drive unit, respectively. A trip unit and an adjustment unit are disposed between the force-applying rod and the transmission rod. The adjustment unit has a main scale ring, an adjustment ring, and a secondary scale ring. The drive unit is first started to tighten a workpiece in place quickly, and then the workpiece is further tightened manually. The workpiece can be locked quickly and accurately with a constant torque. The positions of the main scale ring and the secondary scale ring can be adjusted to correct the torque value.

10 Claims, 12 Drawing Sheets

TORQUE WRENCH

FIELD OF THE INVENTION

The present invention relates to a torque wrench. The torque wrench can be driven by power and operated manually.

BACKGROUND OF THE INVENTION

A conventional torque wrench has a main body. The main body includes a working head. The working head is connected to a motor. In this way, the motor is started to drive the working head to tighten a workpiece quickly, and then the workpiece is tightened with a preset torque value manually.

However, the conventional torque wrench uses an external motor, which is cumbersome and unfavorable for use in narrow spaces. Moreover, the conventional torque wrench does not have a torque value indication and a torque value correction mechanism, so it is not easy to set and correct the preset torque value.

SUMMARY OF THE INVENTION

The primary object of the present invention is to provide a torque wrench. The torque wrench can be driven by power and operated manually for locking a workpiece quickly and accurately. Besides, the torque wrench is able to indicate and correct the torque value.

In order to achieve the above object, the torque wrench provided by the present invention comprises a force-applying rod. The force-applying rod is connected to a transmission rod. The transmission rod can swing relative to the force-applying rod. A transmission shaft is rotatably disposed in the transmission rod. One end of the transmission shaft is connected to a drive unit for driving the transmission shaft to rotate. The other end of the transmission shaft is connected to a head unit. The head unit is driven by the transmission shaft to rotate relative to the force-applying rod. A trip unit is disposed between the force-applying rod and the transmission rod. The trip unit includes a slide sleeve that is movable along the transmission rod, at least one trip member between one side of the slide sleeve and the force-applying rod, and a torsion spring connected to another side of the slide sleeve. The torsion spring elastically leans against the slide sleeve to move toward the force-applying rod. An adjustment unit is disposed on the transmission rod. The adjustment unit includes a main scale ring that is movable along the transmission rod. A main scale is disposed on a peripheral side of the main scale ring. The main scale ring includes a first locking structure for the main scale ring to be selectively locked on the transmission rod. The adjustment unit further includes an adjustment ring between the torsion spring and the main scale ring and a secondary scale ring that is rotatably connected to the adjustment ring. A secondary scale is disposed on a peripheral side of the secondary scale ring corresponding to the main scale. The secondary scale ring includes a second locking structure for the secondary scale ring to be selectively locked on the adjustment ring.

The user can start the drive unit to drive the transmission shaft to rotate the head unit, so as to quickly tighten a workpiece in place. Then, the drive unit is pulled again, so that the acting force is transmitted to the force-applying rod via the trip unit, and the workpiece is further tightened manually. When the acting force reaches the torque value, the trip unit trips to interrupt the transmission of the force, so that the workpiece can be locked quickly and accurately with a constant torque. It is convenient in operation. On the other hand, the user can adjust the positions of the main scale ring and the secondary scale ring so that the values of the main scale and the secondary scale match the torque value. The torque value can be corrected quickly and conveniently.

DETAILED DESCRIPTION OF THE PREFERRED EMBODIMENTS

Embodiments of the present invention will now be described, by way of example only, with reference to the accompanying drawings.

Figure 1:
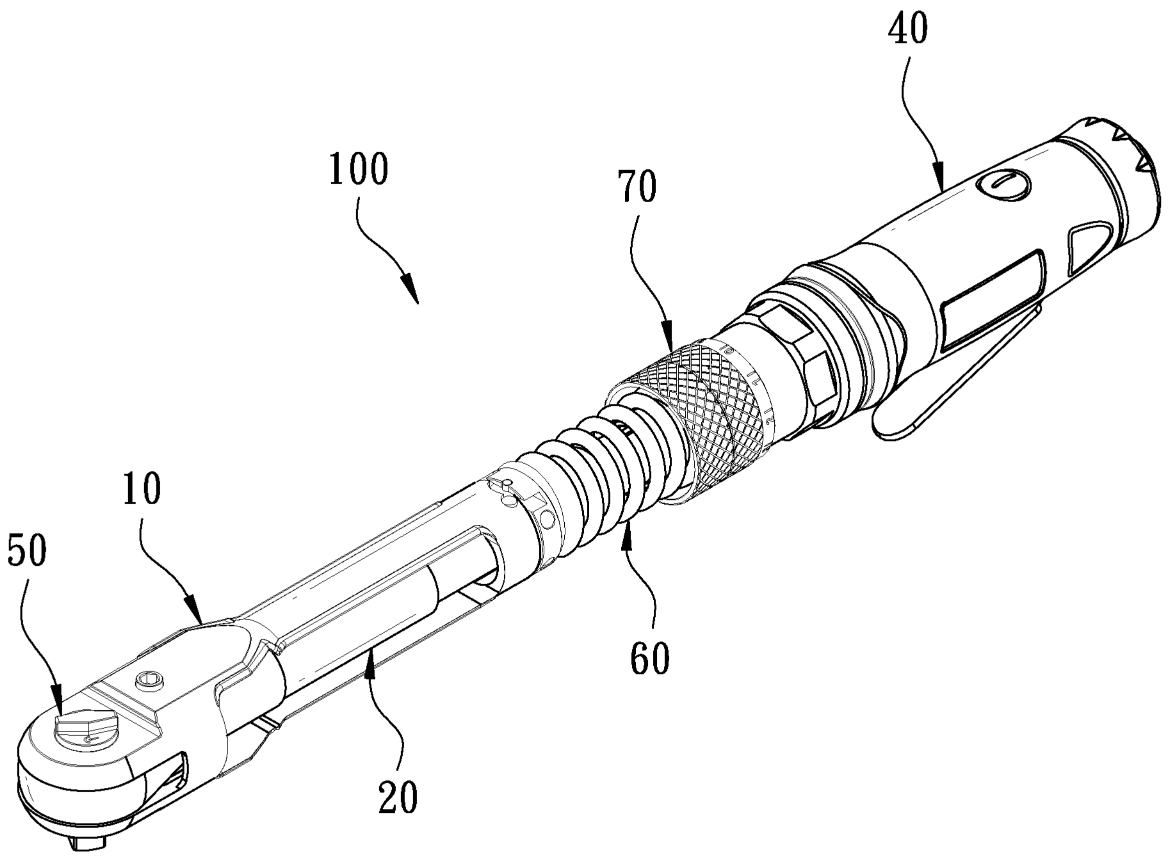
FIG. 1 is a perspective view in accordance with a preferred embodiment of the present invention.
Figure 2:
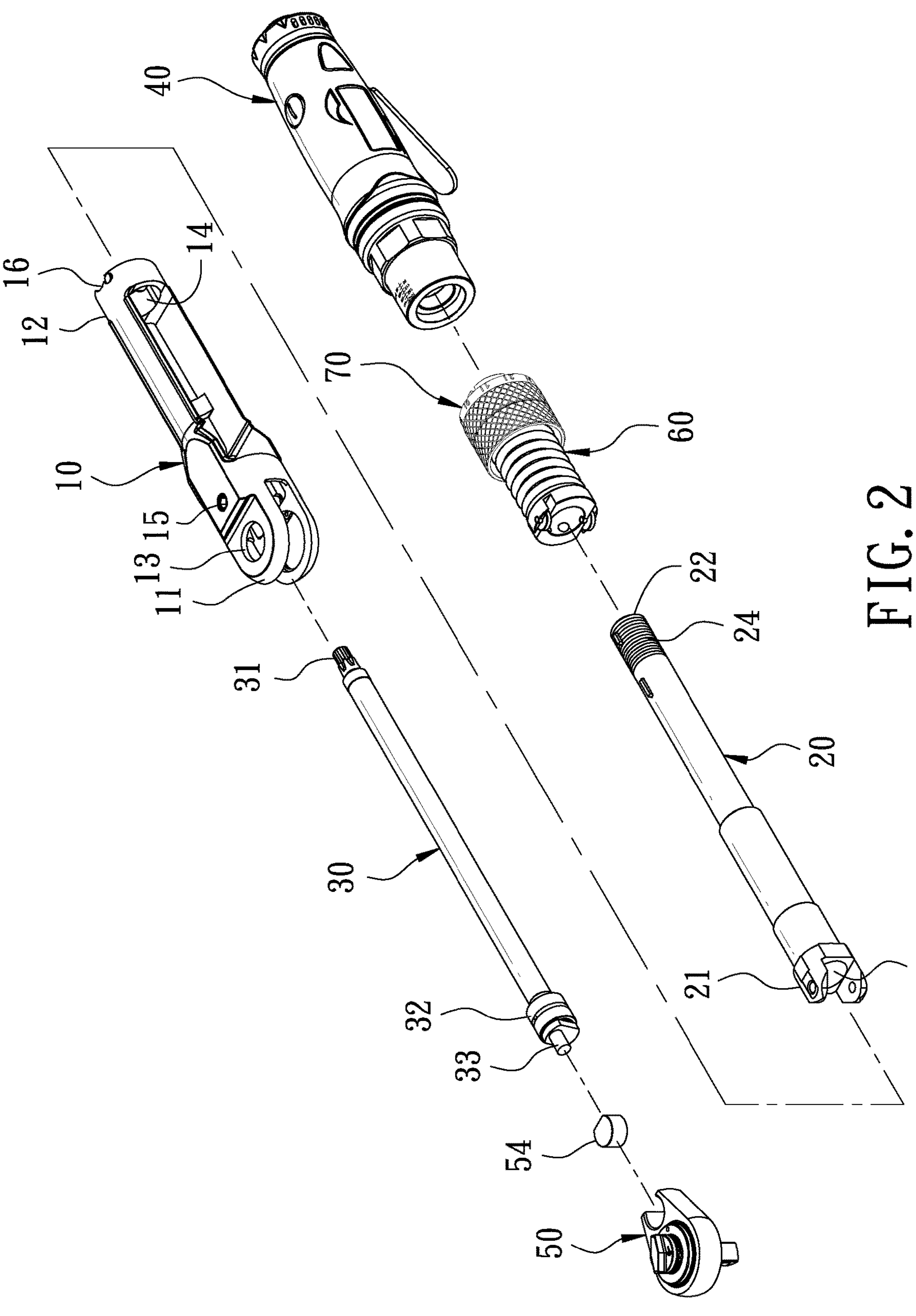
FIG. 2 is an exploded view in accordance with the preferred embodiment of the present invention.
Figure 3:
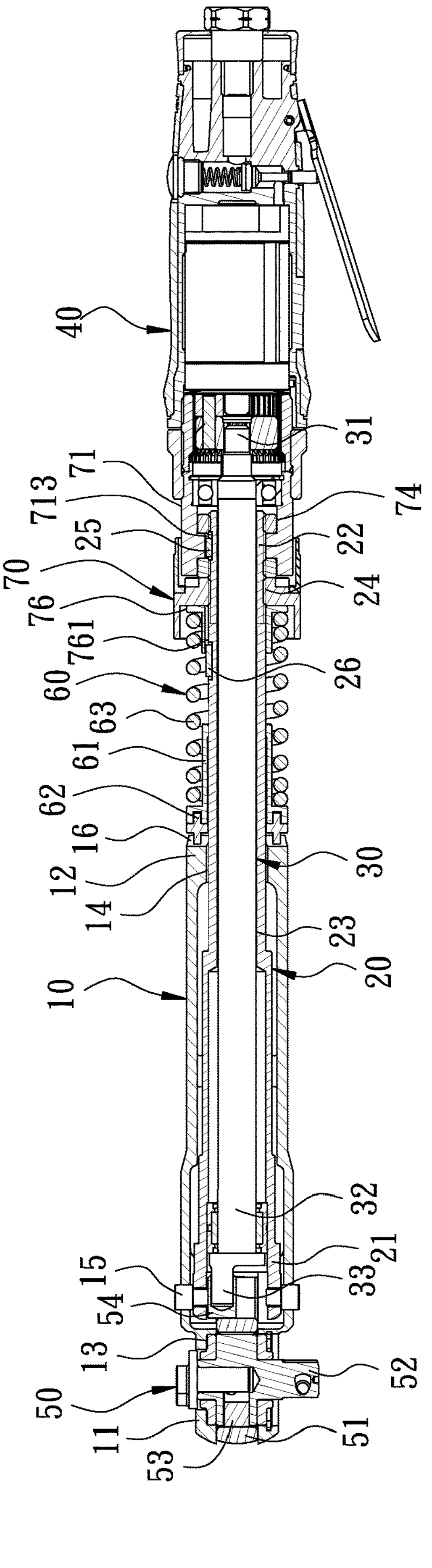
FIG. 3 is a cross-sectional view in accordance with the preferred embodiment of the present invention.

FIG. 1 is a perspective view in accordance with a preferred embodiment of the present invention. FIG. 2 is an exploded view in accordance with the preferred embodiment of the present invention. FIG. 3 is a cross-sectional view in accordance with the preferred embodiment of the present invention. The present invention discloses a torque wrench 100. The torque wrench 100 comprises a force-applying rod 10, a transmission rod 20, a transmission shaft 30, a drive unit 40, a head unit 50, a trip unit 60, and an adjustment unit 70.

The force-applying rod 10 has a front end 11 and an opposing rear end 12. The front end 11 has a coupling hole 13. The rear end 12 has a perforation 14 communicating with the coupling hole 13. The force-applying rod 10 further has a pivot portion 15 adjacent to the front end 11.

The transmission rod 20 is disposed along the axial direction of the force-applying rod 10. The transmission rod 20 has a front end 21, an opposing rear end 22, and a shaft hole 23 passing through the first end 21 and the second end 22. The first end 21 is inserted in the force-applying rod 10 from the perforation 14 and is pivotally connected to the pivot portion 15, so as to swing left and right relative to the force-applying rod 10.

The transmission shaft 30 is inserted in the shaft hole 23. The transmission shaft 30 has an input end 31 facing the second end 22 and an output end 32 facing the coupling hole 13.

The drive unit 40 is disposed at the second end 22 of the transmission rod 20 and connected to the input end 31 of the transmission shaft 30 for driving the transmission shaft 30 to rotate.

The head unit 50 is disposed in the coupling hole 13 and connected to the output end 32 of the transmission shaft 30. The head unit 50 is driven by the transmission shaft 30 to rotate relative to the force-applying rod 10.

The trip unit 60 is disposed between the force-applying rod 10 and the transmission rod 20. When the user pulls the transmission rod 20 by hand, the acting force will be transmitted to the force-applying rod 10 via the tripping unit 60. When the acting force reaches a torsion value, the trip unit 60 will trip so that the acting force will not continue to be transmitted to the force-applying rod 10.

The adjustment unit 70 is disposed on the transmission rod 20 and located between the drive unit 40 and the trip unit 60. The adjustment unit 70 is configured to adjust the torque value of the trip unit 60.

Thus, the user can hold the drive unit 40 by hand and start the drive unit 40 to drive the transmission shaft 30 to rotate the head unit 50, so as to tighten a workpiece in place quickly. Then, the drive unit 40 is pulled again, so that the acting force is transmitted to the force-applying rod 10 via the trip unit 60, and the workpiece is further tightened manually. When the acting force reaches the torque value, the trip unit 60 trips to interrupt the transmission of the force, so that the workpiece can be locked quickly and accurately with a constant torque. It is convenient in operation. Since the parts of the torque wrench 100 are arranged along the same axis, the structure of the torque wrench 100 is relatively compact. The torque wrench 100 can be operated in a narrow environment easily.

Figure 4:
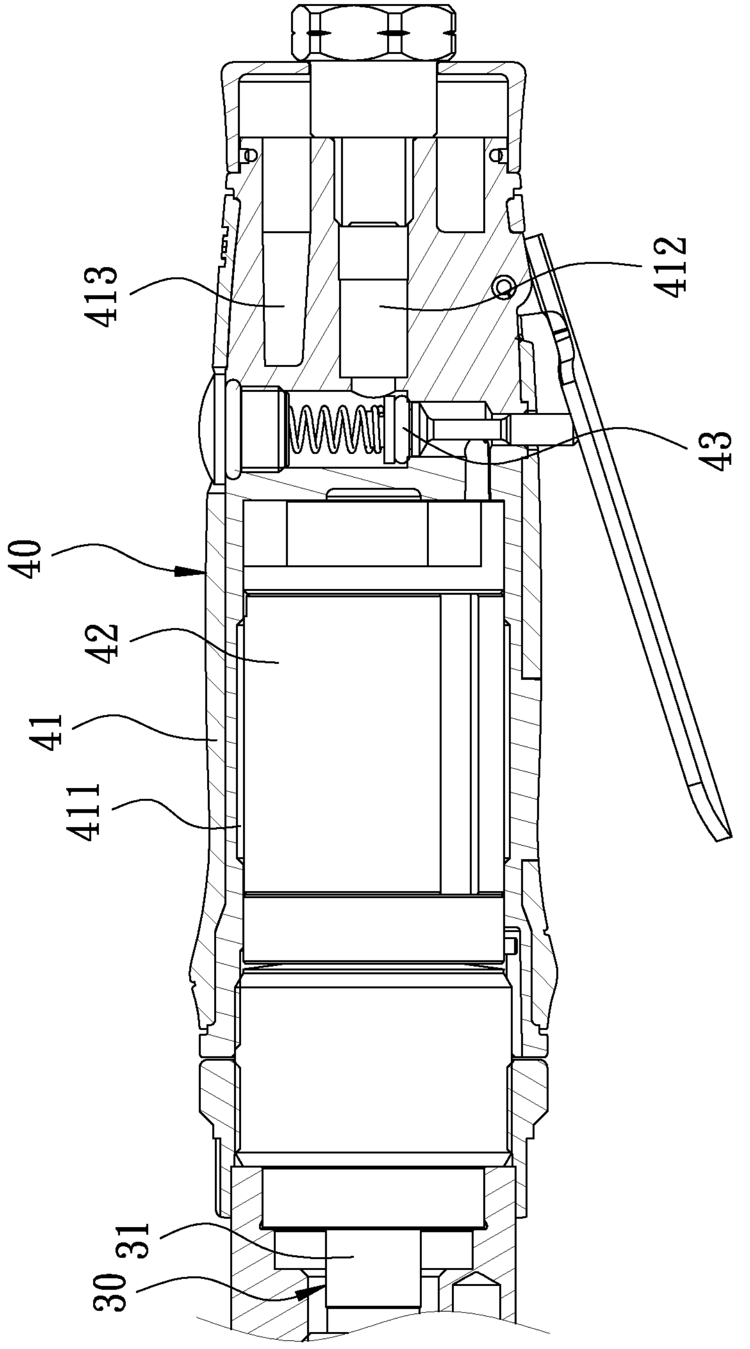
FIG. 4 is a cross-sectional view of the drive unit in accordance with the preferred embodiment of the present invention.

FIG. 4 is a cross-sectional view of the drive unit in accordance with the preferred embodiment of the present invention. Referring to FIG. 3 and FIG. 4, the drive unit 40 may be a pneumatic motor as shown in this embodiment, or an electric motor or other drive sources. The drive unit 40 includes a handle 41. The handle 41 is disposed on the second end 22 of the transmission rod 20 along the axial direction of the transmission rod 20. The handle 41 has an accommodation space 411 therein. A motor unit 42 is disposed in the accommodation space 411. One end of the motor unit 42 is connected to the input end 31 of the transmission shaft 30, and the other end of the motor unit 42 is connected to an air intake channel 412 and an air exhaust channel 413. A valve control member 43 is disposed at the air intake channel 412. An external air source is connected to the air intake channel 412. When the user opens the valve control member 43, the external air source pushes the motor unit 42 to rotate and then is discharged from the air exhaust channel 413, so that the motor unit 42 can drive the transmission shaft 30 to rotate. The detailed structure of the motor unit 42 is the prior art, so it will not be repeated here.

Figure 5:
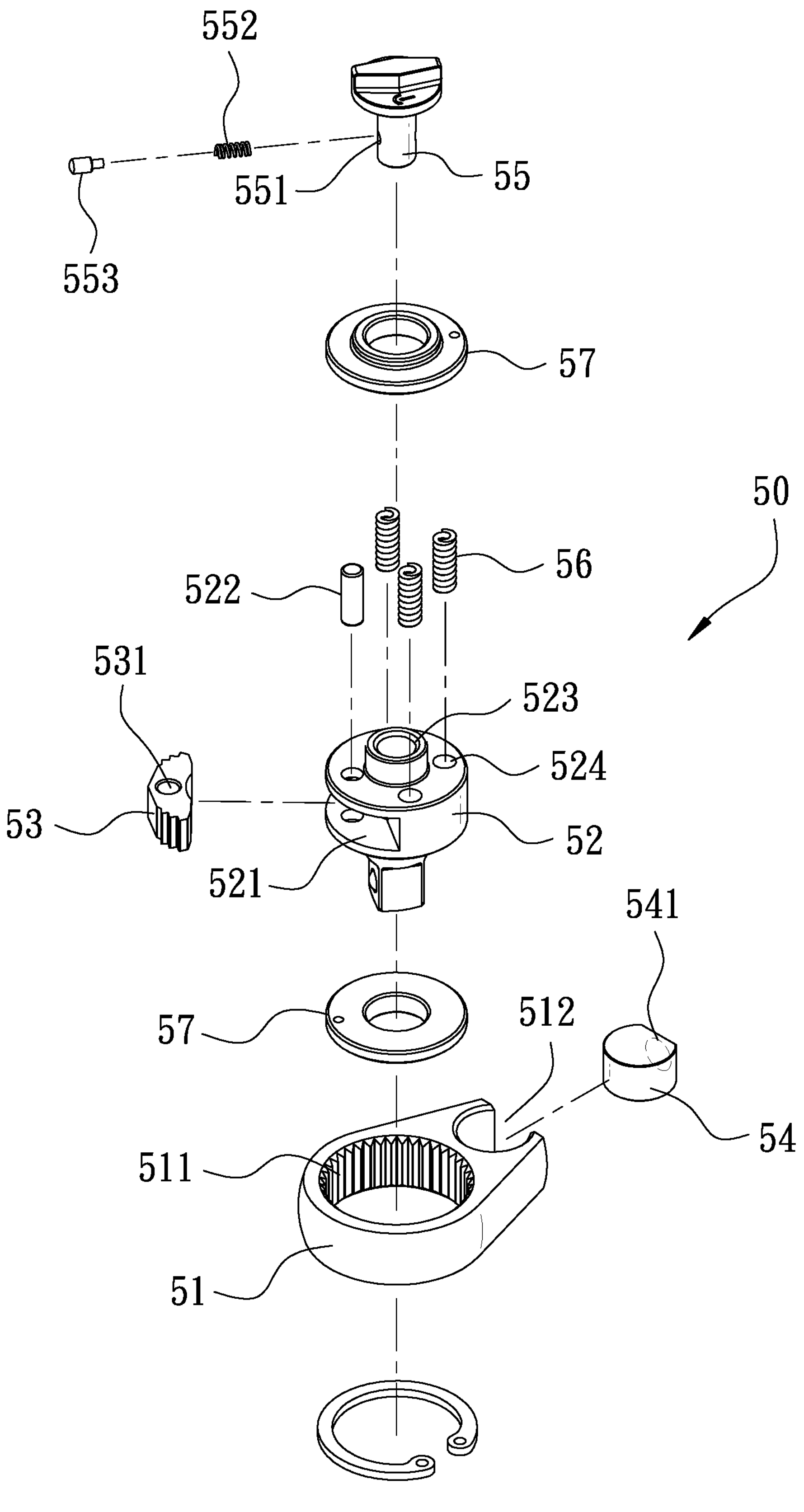
FIG. 5 is an exploded view of the head unit in accordance with the preferred embodiment of the present invention.
Figure 6:
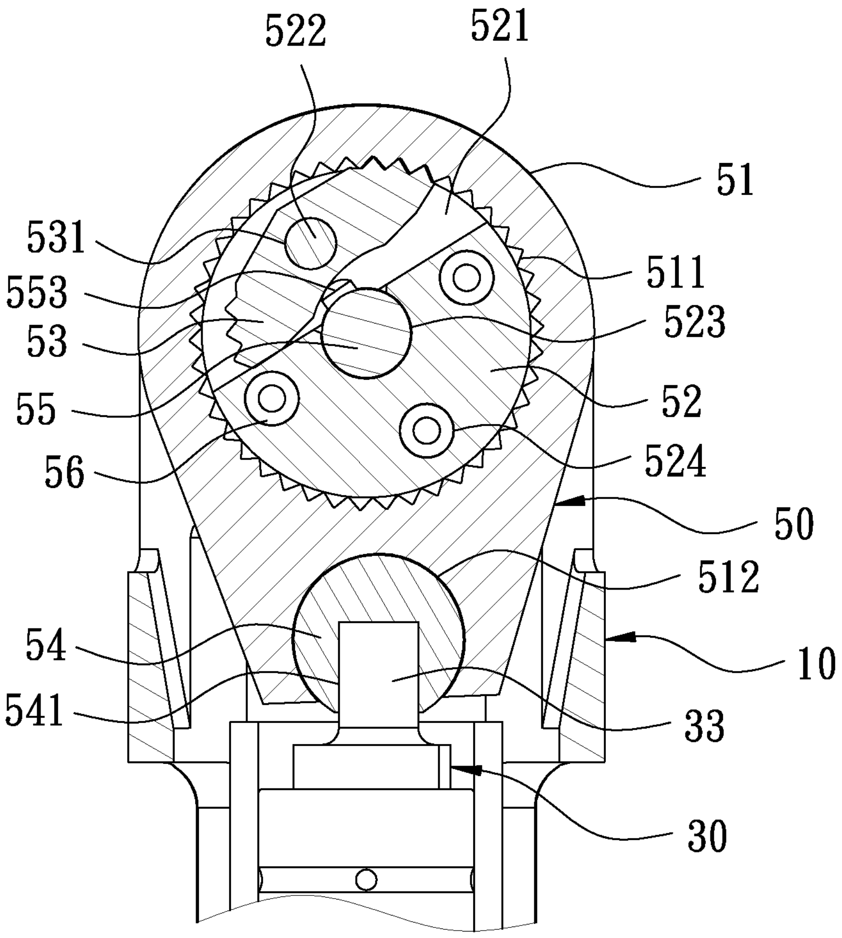
FIG. 6 is a cross-sectional view of the head unit in accordance with the preferred embodiment of the present invention.

FIG. 5 is an exploded view of the head unit in accordance with the preferred embodiment of the present invention. FIG. 6 is a cross-sectional view of the head unit in accordance with the preferred embodiment of the present invention. Referring to FIG. 3, FIG. 5 and FIG. 6, the head unit 50 includes a ratchet seat 51. The ratchet seat 51 has a ratchet hole 511. A drive head 52 is disposed in the ratchet hole 511. A detent 53 is disposed between the drive head 52 and the ratchet hole 511. In this embodiment, the drive head 52 has an accommodation groove 521. A pivot pin 522 is disposed in the accommodation groove 521. The detent 53 is accommodated in the accommodation groove 521. The detent 53 has a pivot hole 531 corresponding to the pivot pin 522. The pivot pin 522 is inserted through the pivot hole 531, so that the detent 53 can swing relative to the drive head 52 in the accommodation groove 521. In addition, the ratchet seat 51 further has a swing hole 512. A swing block 54 is disposed in the swing hole 512. The swing block 54 has a connecting hole 541. The output end 32 of the transmission shaft 30 has an eccentric post 33. The eccentric post 33 is inserted in the connecting hole 541, so that the swing block 54 is connected to the output end 32 of the transmission shaft 30. When the transmission shaft starts to rotate, the eccentric post 33 drives the swing block 54, and the ratchet seat 51 is driven to swing left and right relative to the force-applying rod 10. The drive head 52 is driven by the detent 53, so that the drive head 52 continues to rotate in the same direction.

Referring to FIG. 5 and FIG. 6, the drive head 52 further has a through hole 523 communicating with the accommodation groove 521. A switching button 55 is disposed in the through hole 523. The switching button 55 has an engaging hole 551 corresponding to the accommodation groove 521. An engaging spring 552 and an engaging pin 553 are disposed in the engaging hole 551 in sequence. The engaging pin 553 is pushed by the elastic force of the engaging spring 552 to elastically lean against the detent 53. Thereby, the ratcheting direction of the detent 53 can be controlled by turning the switching button 55 to change the rotating direction of the drive head 52. The drive head 52 is formed with a plurality of accommodation holes 524. An elastic member 56 is disposed in each of the accommodation holes 524. Two opposite sides of the drive head 52 are provided with thrust washers 57. The thrust washers 57 are pressed against two ends of the elastic member 56 respectively, so as to prevent the drive head 52 from being stuck.

Figure 7:
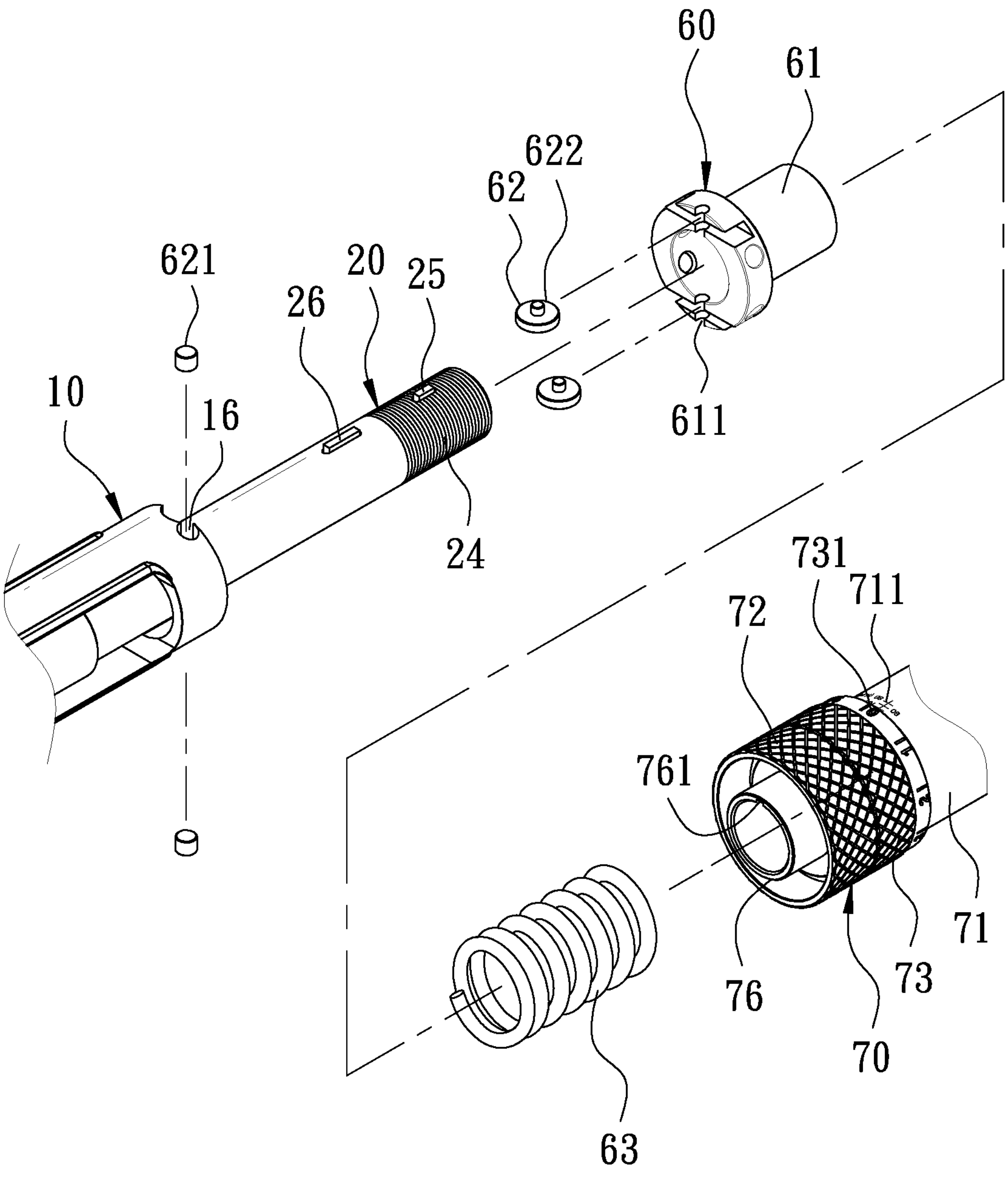
FIG. 7 is an exploded view of the trip unit in accordance with the preferred embodiment of the present invention.
Figure 8:
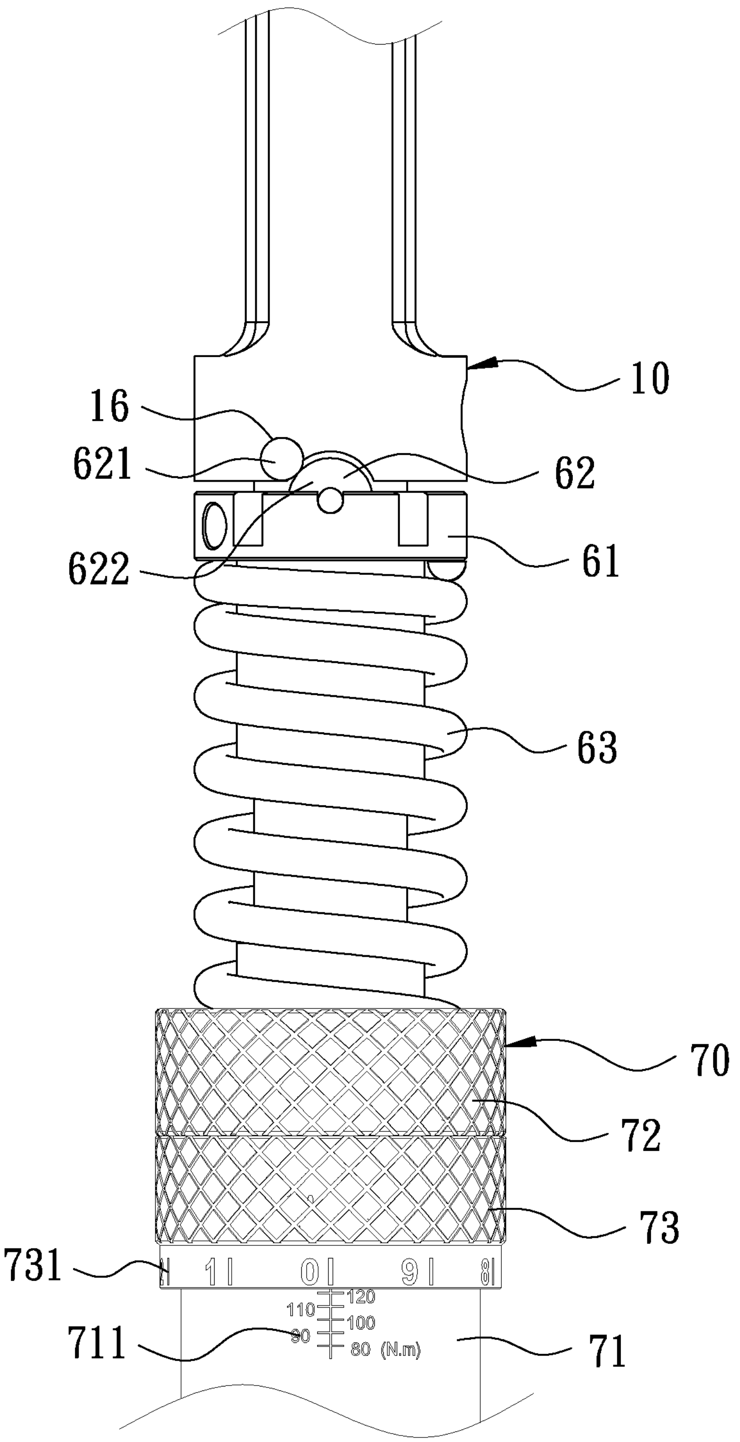
FIG. 8 is a top view of the trip unit in accordance with the preferred embodiment of the present invention.

FIG. 7 is an exploded view of the trip unit in accordance with the preferred embodiment of the present invention. FIG. 8 is a top view of the trip unit in accordance with the preferred embodiment of the present invention. Referring to FIG. 3, FIG. 7 and FIG. 8, the trip unit 60 includes a slide sleeve 61 fitted on the transmission rod 20, at least one trip member 62 between one side of the slide sleeve 61 and the rear end 12 of the force-applying rod 10, and a torsion spring 63 connected to the other side of the slide sleeve 61. The other end of the torsion spring 63 is against the adjustment unit 70, so that the torsion spring 63 can elastically push against the slide sleeve 61 to move toward the force-applying rod 10. In this embodiment, the force-applying rod 10 has a first receiving groove 16 at the rear end 12. The slide sleeve 61 has a second receiving groove 611 corresponding to the first receiving groove 16. The trip member 62 includes a roller 621 rotatably disposed in the first receiving groove 16 and a rolling wheel 622 rotatably disposed in the second receiving groove 611. The rolling wheel 622 is pushed by the elastic force of the torsion spring 63 to elastically lean against the roller 621. When the user pulls the handle 41 of the drive unit 40, the acting force will be transmitted from the transmission rod 20 to the roller 621 via the rolling wheel 622, so as to drive the force-applying rod 10 synchronously. When the acting force exceeds the elastic force of the torsion spring 63, that is, when the torsion value is reached, the rolling wheel 622 slips relative to the roller 621 so that the acting force will not be continuously transmitted to the force-applying rod 10.

Figure 9:
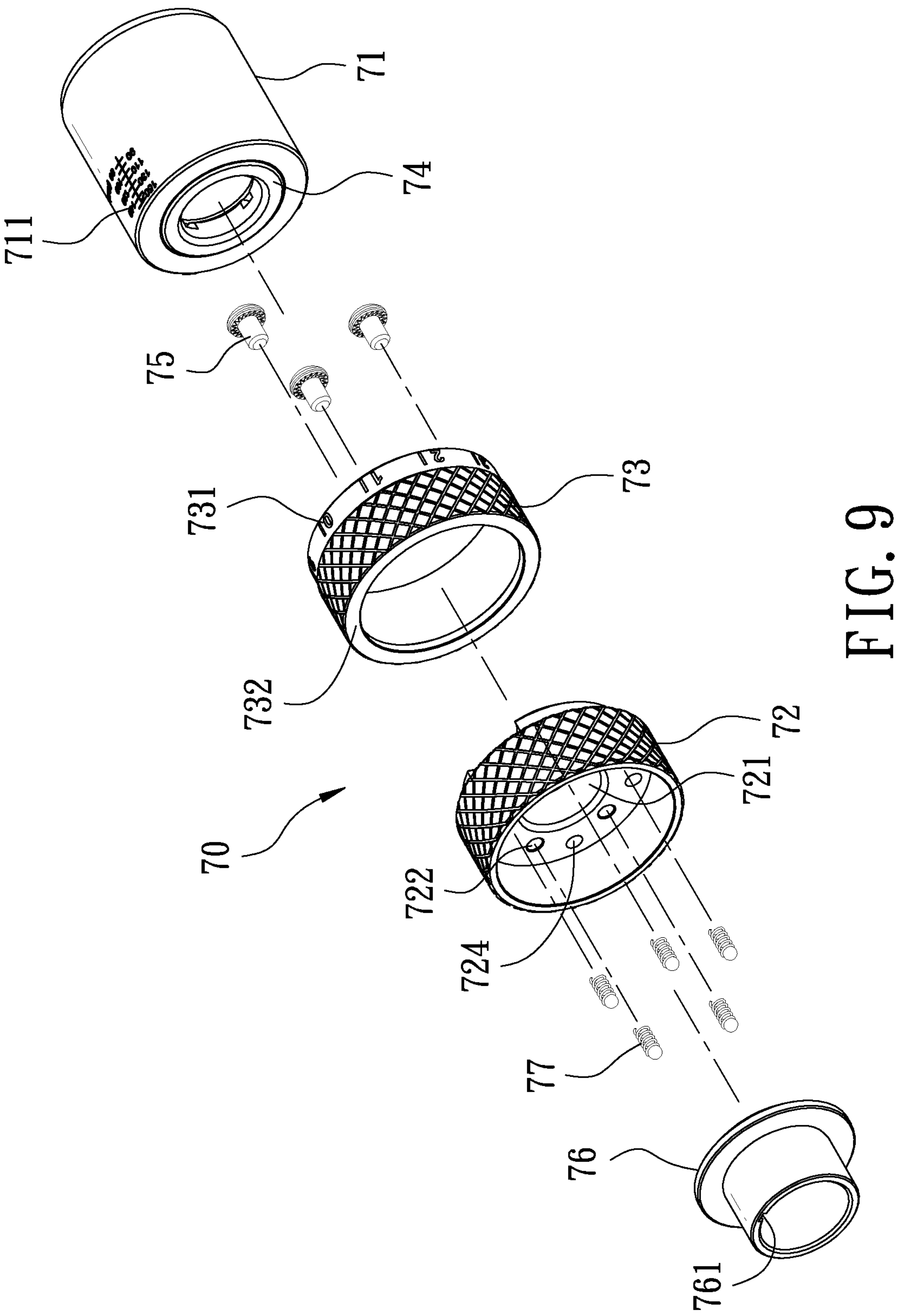
FIG. 9 is an exploded view of the adjustment unit in accordance with the preferred embodiment of the present invention.
Figure 10:
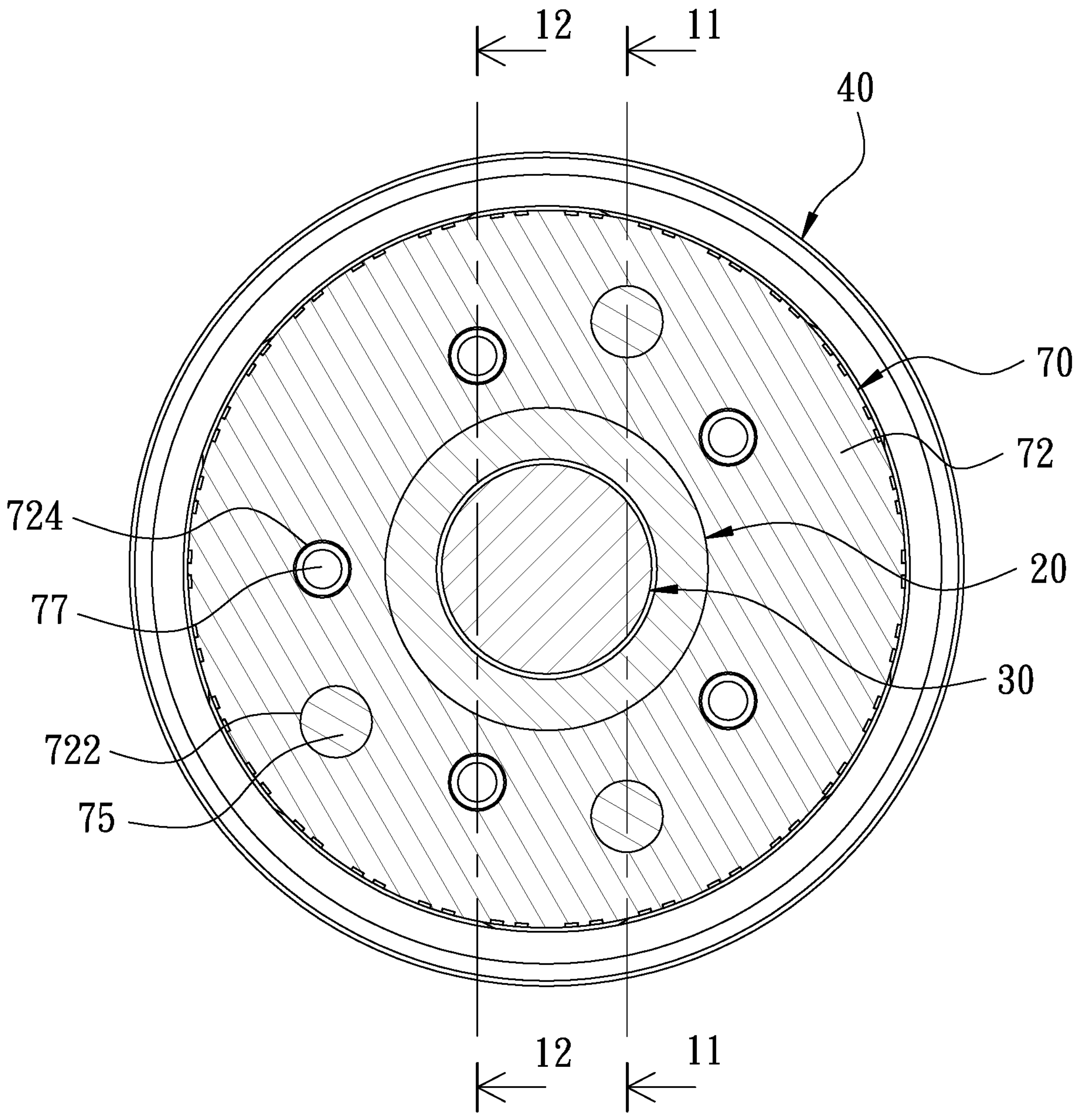
FIG. 10 is a cross-sectional view of the adjustment unit in accordance with the preferred embodiment of the present invention.

FIG. 9 is an exploded view of the adjustment unit in accordance with the preferred embodiment of the present invention. FIG. 10 is a cross-sectional view of the adjustment unit in accordance with the preferred embodiment of the present invention. Referring to FIG. 7, FIG. 9 and FIG. 10, the second end 22 of the transmission rod 20 has a threaded portion 24. The adjustment unit 70 is arranged at the threaded portion 24. The adjustment unit 70 includes a main scale ring 71. A main scale 711 is disposed on the peripheral side of the main scale ring 71. The adjustment unit 70 further includes an adjustment ring 72 between the torsion spring 63 and the main scale ring 71. The adjustment ring 72 has a screw hole 721. The threaded portion 24 is screwed to the screw hole 721, so that the adjustment ring 72 can be screwed back and forth on the transmission rod 20 to push the torsion spring 63 for adjusting the elastic force of the torsion spring 63. The adjustment unit 70 further includes a secondary scale ring 73 arranged on the adjustment ring 72. A secondary scale 731 is disposed on the peripheral side of the secondary scale ring 73 corresponding to the main scale 711. In this way, the user can set the elastic force of the torsion spring 63 accurately via the main scale 711 and the secondary scale 731.

Figure 11:
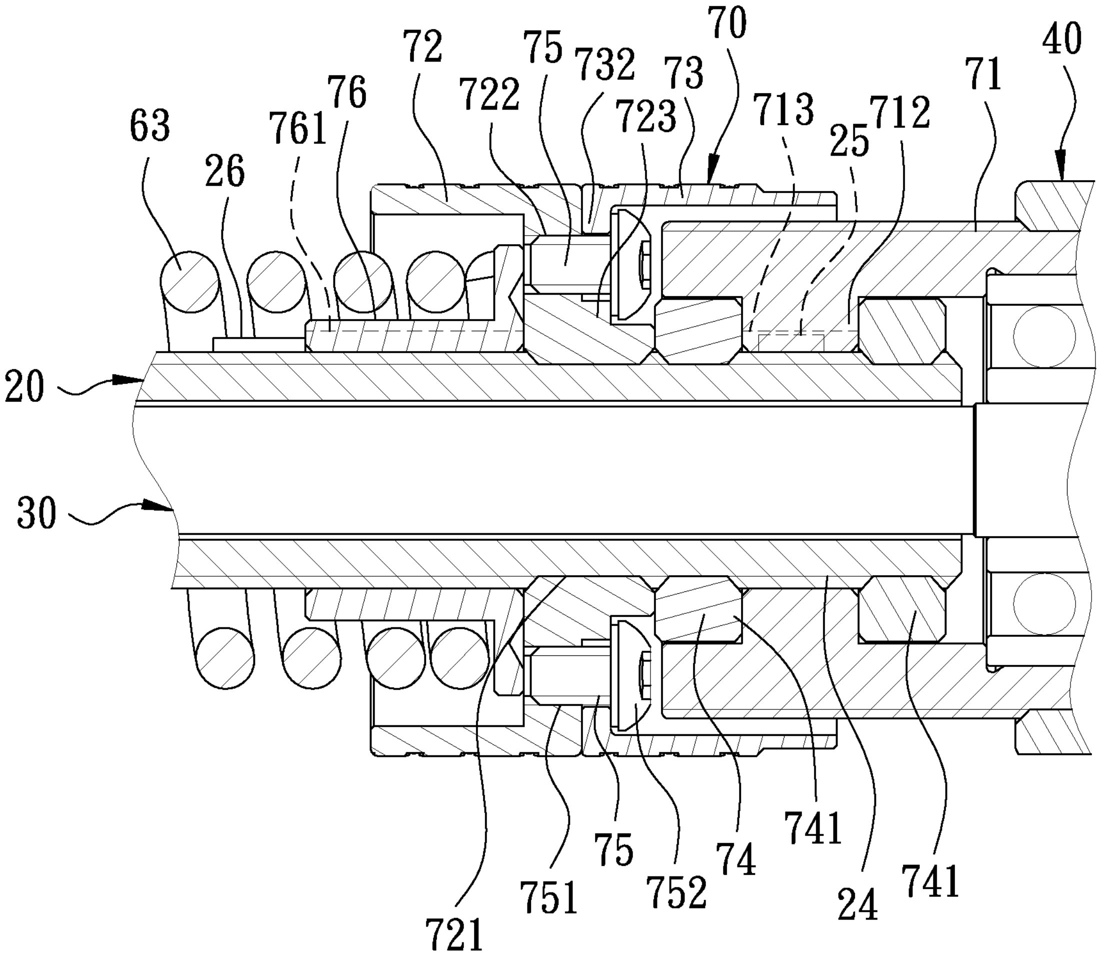
FIG. 11 is a cross-sectional view taken along line 11-11 of FIG. 10.

FIG. 11 is a cross-sectional view taken along line 11-11 of FIG. 10. Referring to FIG. 3, FIG. 9 and FIG. 11, the main scale ring 71 includes a first locking structure 74 for the main scale ring 71 to be selectively locked on the transmission rod 20 or to be selectively unlocked, so that the main scale ring 71 can slide along the axial direction of the transmission rod 20. In this embodiment, a first restricting portion 25 is disposed on the peripheral side of the transmission rod 20, and an annular flange 712 is disposed on the inner wall of the main scale ring 71. The inner wall of the annular flange 712 is formed with a first restricting groove 713 along the axial direction of the transmission rod 20. The first restricting portion 25 is inserted in the first restricting groove 713, so that the main scale ring 71 can only move along the axial direction of the transmission rod 20. The first locking structure 74 includes two locking rings 741. The locking rings 741 are screwed to the threaded portion 24 and selectively clamped at both sides of the annular flange 712 for locking the main scale ring 71 to the transmission rod 20. The secondary scale ring 73 is rotatably sleeved on the adjustment ring 72. The secondary scale ring 73 includes a second locking structure 75 for the secondary scale ring 73 to be selectively locked on the adjustment ring 72 or to be selectively unlocked, so that the secondary scale ring 73 can rotate relative to the adjustment ring 72. In this embodiment, at least one locking hole 722 is formed on one side of the adjustment ring 72 facing the main scale ring 71. A first flange 723 is disposed on the peripheral side of the locking hole 722. The secondary scale ring 73 has a second flange 732 corresponding to the first flange 723. The second locking structure 75 includes a locking member 751 corresponding to each locking hole 722. One end of the locking member 751 is a locking portion 752. The locking portion 752 is locked in the locking hole 722. The other end of the locking member 751 passes through the locking hole 722 and is enlarged outwardly to form a pressing portion 753. The pressing portion 753 is selectively pressed against the first flange 723 and the second flange 732 to lock the secondary scale ring 73 to the adjustment ring 72. Thereby, when the torsion value is to be corrected, the adjustment ring 72 is first screwed to the transmission rod 20 to measure the elastic force of the torsion spring 63. After that, the secondary scale ring 73 is mounted on the adjustment ring 72, and the secondary scale ring 73 is rotated to adjust the position of the secondary scale 731. Then, the second locking structure 75 is locked to secure the position of the secondary scale ring 73. Finally, the main scale ring 71 is installed and the position of the main scale 711 is adjusted. Then, the first locking structure 74 is locked to secure the position of the main scale ring 71. In this way, the values of the main scale 711 and the secondary scale 731 can be matched with the elastic force of the torsion spring 63, and the torsion value can be corrected quickly and easily.

Figure 12:
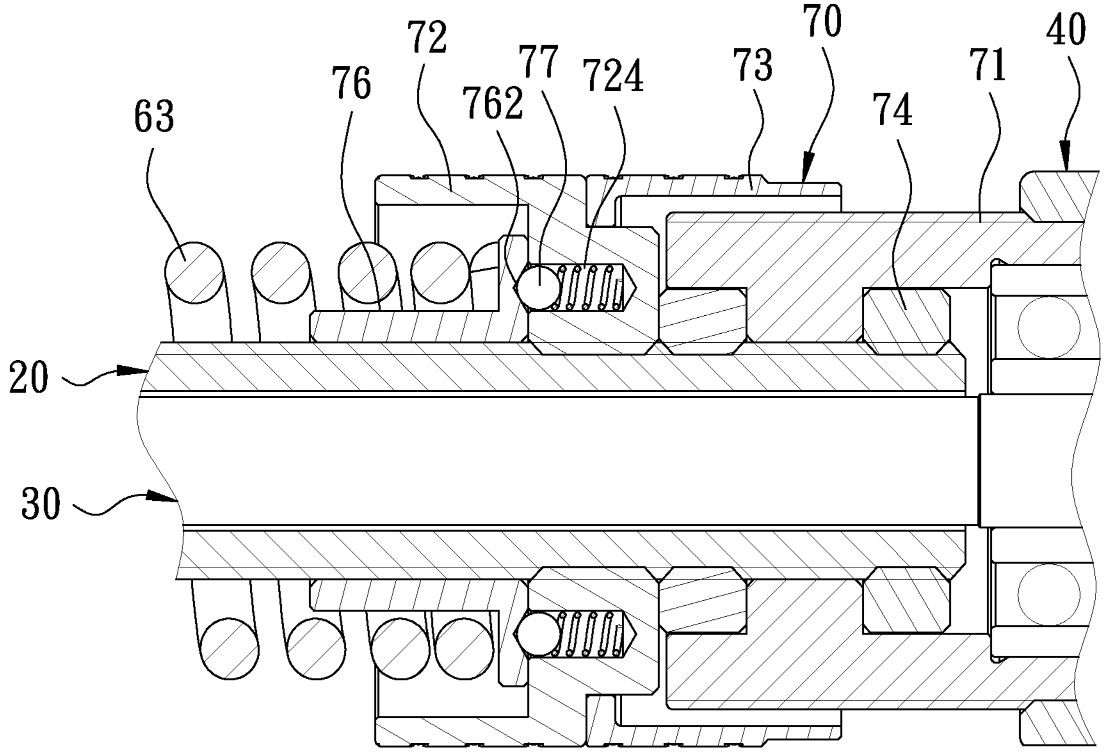
FIG. 12 is a cross-sectional view taken along line 12-12 of FIG. 10.

FIG. 12 is a cross-sectional view taken along line 12-12 of FIG. 10. Referring to FIG. 7, FIG. 9 and FIG. 12, the adjustment unit 70 further includes a slide ring 76 between the torsion spring 63 and the adjustment ring 72. The slide ring 76 is pushed by the adjustment ring 72 and the torsion spring 63 to move along the transmission rod 20. A second restricting portion 26 is disposed on the peripheral side of the transmission rod 20. The inner wall of the slide ring 76 is formed with a second restricting groove 761 along the axial direction of the transmission rod 20. The second restricting portion 26 is inserted in the second restricting groove 761, so that the slide ring 76 can only move along the axial direction of the transmission rod 20. Another side of the adjustment ring 72, facing the torsion spring 63, is formed with at least one positioning hole 724. The slide ring 76 has at least one positioning groove 762 corresponding to the positioning hole 724. The adjustment unit 70 further includes at least one elastic positioning member 77, for example, the combination of a spring and a steel ball shown in this embodiment. The elastic positioning member 77 is accommodated in the positioning hole and elastically leans against the positioning groove. Therefore, the user must rotate the adjustment ring 72 forcefully to disengage the elastic positioning member 77 from the positioning groove 762 to rotate the adjustment ring 72 smoothly, thereby preventing the adjustment ring 72 from rotating unexpectedly.

What is claimed is:

1. A torque wrench, comprising:

a force-applying rod, having a front end and an opposing rear end, the front end having a coupling hole, the force-applying rod further having a pivot portion adjacent to the front end;

a transmission rod, disposed along an axial direction of the force-applying rod, the transmission rod having a front end and an opposing rear end, the first end being pivotally connected to the pivot portion, the transmission rod further having a shaft hole passing through the first end and the second end;

a transmission shaft, inserted in the shaft hole, the transmission shaft having an input end facing the second end and an output end facing the coupling hole;

a drive unit, disposed at the second end of the transmission rod and connected to the input end of the transmission shaft for driving the transmission shaft to rotate;

a head unit, disposed in the coupling hole and connected to the output end of the transmission shaft, the head unit being driven by the transmission shaft to rotate relative to the force-applying rod;

a trip unit, disposed between the force-applying rod and the transmission rod, the trip unit including a slide sleeve that is movable along the transmission rod, at least one trip member between one side of the slide sleeve and the rear end of the force-applying rod, and a torsion spring connected to another side of the slide sleeve, the torsion spring elastically leaning against the slide sleeve to move toward the force-applying rod;

an adjustment unit, disposed on the transmission rod, the adjustment unit including a main scale ring that is movable along the transmission rod, a main scale being disposed on a peripheral side of the main scale ring, the main scale ring including a first locking structure for the main scale ring to be selectively locked on the transmission rod, the adjustment unit further including an adjustment ring between the torsion spring and the main scale ring, the adjustment ring being movable along the transmission rod for adjusting an elastic force of the torsion spring, the adjustment unit further including a secondary scale ring that is rotatably connected to the adjustment ring, a secondary scale being disposed on a peripheral side of the secondary scale ring corresponding to the main scale, the secondary scale ring including a second locking structure for the secondary scale ring to be selectively locked on the adjustment ring.

2. The torque wrench as claimed in claim 1, wherein the drive unit includes a handle, the handle is disposed on the second end of the transmission rod along an axial direction of the transmission rod, the handle has an accommodation space therein, a motor unit is disposed in the accommodation space, one end of the motor unit is connected to the input end of the transmission shaft, another end of the motor unit is connected to an air intake channel and an air exhaust channel, and a valve control member is disposed at the air intake channel.

3. The torque wrench as claimed in claim 1, wherein the head unit includes a ratchet seat, the ratchet seat has a ratchet hole, a drive head is disposed in the ratchet hole, a detent is disposed between the drive head and the ratchet hole, the ratchet seat further has a swing hole, a swing block is disposed in the swing hole, the swing block is connected to the output end of the transmission shaft and is driven by the transmission shaft, the ratchet seat is driven to swing left and right relative to the force-applying rod, and the drive head is driven to rotate by the detent.

4. The torque wrench as claimed in claim 3, wherein the drive head is formed with a plurality of accommodation holes, an elastic member is disposed in each of the accommodation holes, two opposite sides of the drive head are provided with thrust washers, and the thrust washers are pressed against two ends of the elastic member, respectively.

5. The torque wrench as claimed in claim 1, wherein the force-applying rod has a first receiving groove at the rear end, the slide sleeve has a second receiving groove corresponding to the first receiving groove, the trip member includes a roller rotatably disposed in the first receiving groove and a rolling wheel rotatably disposed in the second receiving groove, and the rolling wheel is pushed by the elastic force of the torsion spring to elastically lean against the roller.

6. The torque wrench as claimed in claim 1, wherein the second end of the transmission rod has a threaded portion, the adjustment ring has a screw hole, and the threaded portion is screwed to the screw hole so that the adjustment ring can be screwed back and forth on the transmission rod for adjusting the elastic force of the torsion spring.

7. The torque wrench as claimed in claim 6, wherein a first restricting portion is disposed on a peripheral side of the transmission rod, an annular flange is disposed on an inner wall of the main scale ring, an inner wall of the annular flange is formed with a first restricting groove along an axial direction of the transmission rod, the first restricting portion is inserted in the first restricting groove so that the main scale ring can only move along the axial direction of the transmission rod, the first locking structure includes two locking rings, and the locking rings are screwed to the threaded portion and selectively clamped at both sides of the annular flange for locking the main scale ring to the transmission rod.

8. The torque wrench as claimed in claim 1, wherein one side of the adjustment ring, facing the main scale ring, is formed with at least one locking hole, a first flange is disposed on a peripheral side of the locking hole, the secondary scale ring has a second flange corresponding to the first flange, the second locking structure includes a locking member corresponding to the locking hole, one end of the locking member is a locking portion, the locking portion is locked in the locking hole, another end of the locking member passes through the locking hole and is enlarged outwardly to form a pressing portion, and the pressing portion is selectively pressed against the first flange and the second flange for locking the secondary scale ring to the adjustment ring.

9. The torque wrench as claimed in claim 1, wherein one side of the adjustment ring, facing the torsion spring, is formed with at least one positioning hole, the adjustment unit further includes a slide ring between the torsion spring and the adjustment ring, the slide ring is pushed by the adjustment ring and the torsion spring to move along the transmission rod, the slide ring has at least one positioning groove corresponding to the positioning hole, the adjustment unit further includes at least one elastic positioning member, and the elastic positioning member is accommodated in the positioning hole and elastically leans against the positioning groove.

10. The torque wrench as claimed in claim 9, wherein a second restricting portion is disposed on a peripheral side of the transmission rod, an inner wall of the slide ring is formed with a second restricting groove along an axial direction of the transmission rod, and the second restricting portion is inserted in the second restricting groove so that the slide ring can only move along the axial direction of the transmission rod.

* * * * *